(12) United States Patent
Searle

(10) Patent No.: US 6,247,282 B1
(45) Date of Patent: Jun. 19, 2001

(54) DECK AND BEAM CONNECTOR

(75) Inventor: Tim S. Searle, Noblesville, IN (US)

(73) Assignee: ICON, Incorporated, Fort Wayne, IN (US)

( * ) Notice: Subject to any disclaimer, the term of this patent is extended or adjusted under 35 U.S.C. 154(b) by 0 days.

(21) Appl. No.: 09/429,225

(22) Filed: Oct. 28, 1999

(51) Int. Cl.$^7$ ........................................................ E04B 5/00
(52) U.S. Cl. .................. 52/474; 52/127.1; 52/127.5; 52/127.6; 52/127.7; 52/127.12; 52/782.1; 403/408.1; 403/263
(58) Field of Search .................... 52/474, 127.1, 52/127.5, 127.6, 127.7, 127.12, 656.1, 782.1, 783.1, 476; 403/408.1, 263; 404/40

(56) References Cited

U.S. PATENT DOCUMENTS

| | | | | |
|---|---|---|---|---|
| 3,861,112 | * | 1/1975 | Caroselli | 52/127.5 |
| 4,577,448 | * | 3/1986 | Howorth | 52/584.1 |
| 4,845,915 | * | 7/1989 | Rogers et al. | 52/782.1 |

* cited by examiner

Primary Examiner—Christopher T. Kent
Assistant Examiner—Jennifer I. Thissell
(74) Attorney, Agent, or Firm—Kreig DeVault Lundy, LLP

(57) ABSTRACT

In the broader aspects of the invention there is provided a new and improved deck and beam connector for post and beam structures. The deck and beam connector has a deck flange mounted on the deck, the flange has an opening therein. Depending into the deck is a well secured to the flange. The well has a bottom and a bottom opening therein. A threaded bolt having an enlarged head is positioned within the bottom opening with the threaded portion within the well. The head is positioned within a step-diametered counter-sunk bore in the deck with the larger diameter portion thereof adjacent to the surface opposite that to which the deck flange is connected. A threaded member is positioned on the threaded shaft of the bolt within the well with a spring positioned on the bolt between the threaded member and the well bottom. The bolt is moveable between an extended position and a retracted position into which the bolt head is biased and within the larger diametered portion of the step-diametered bore in the deck. The bolt may be moved into the extended position to be connected to a beam and tightened to firmly grip the deck and beam between the enlarged head and the deck flange or retracted for storage and shipping.

18 Claims, 4 Drawing Sheets

DECK AND BEAM CONNECTOR

BACKGROUND OF THE INVENTION

The present invention relates to deck and beam connectors for use in post and beam structures. More particularly, the invention relates to a quick connect and disconnect deck and beam connector for portable post and beam structures.

Post and beam structures have been used in construction of a number of prefabricated structures. The post and beam structures allow for the various pieces and parts of the structure to be manufactured off site and assembled on site into a variety of different structures. Post and beam structures have proven to be especially useful in portable structures and have taken the form in the past of scaffolding, theater sets, and exhibits and displays for trade shows. Each of these structures have in recent years become more complex. Theater sets, scaffolding and trade show exhibits have all developed into multi-story structures that need the strength of conventionally structured buildings so as to hold numbers of people and their belongings. In such portable devices, there has developed a need for better connectors in the use of erecting and dismantling such structures. Therefore, it is highly desirable to provide a new and improved connector for post and beam structures.

With the development of post and beam structures into multi-story structures, multiple decks are connected to beams to provide multiples stories. In such structures, it is highly desirable to provide new and improved connectors between the various decks and the beams supporting the deck. In many instances, the deck provides a substantial part of the structural strength of the completed structure, and thus, the connection between the deck and the beams connected to the deck need to be secure, and yet for portable devices need to be quickly connected and disconnected. It is therefore highly desirable to provide a new and improved connector for post and beam structures for connecting the deck and beams which is strong and secure. It is also highly desirable to provide a new and improved connector for post and beam structures which can be quickly connected between decks and beams and disconnected as desired.

In portable structures it is highly important that post and beam structures can be assembled and disassembled and packaged for shipment. In the assembly and disassembly, it is unnerving and sometimes catastrophic to have a structure comprised of posts, beams and decks and a plurality of loose connectors. Everyone has experienced the erector set syndrome in which the pieces appear to be safe, but the nuts and bolts become lost during use and need to be replaced. Thus, it is highly desirable to provide a new and improved deck and beam connector for a post and beam structure in which the connector is permanently connected to either the deck or the beam. It is also highly desirable to provide a new and improved deck and beam connector for a post and beam structure in which the connector is connected to the deck or the beam and is tucked into the deck or beam such that the decks and beams can be easily packaged and handled, stored and shipped.

Finally, all post and beam structures suffer from being more expensive than conventional structures because of their high design costs, their uniqueness, and the portability built into such structures. Thus, economics is always a consideration. Thus, it is highly desirable to provide a new and improved deck and beam connector which is simple in construction and inexpensive to manufacture.

Finally, it is highly desirable to provide a new and improved deck and beam connector for a post and beam structure having all of the these features.

SUMMARY OF THE INVENTION

It is therefore an object of the invention to provide a new and improved connector for post and beam structures.

It is also an object of the invention to provide new and improved new and improved connectors between the various decks and the beams supporting the deck.

It is also an object of the invention to provide a new and improved connector for post and beam structures for connecting the deck and beams which is strong and secure.

It is also an object of the invention to provide a new and improved connector for post and beam structures which can be quickly connected between decks and beams and disconnected as desired.

It is also an object of the invention to provide a new and improved deck and beam connector for a post and beam structure in which the connector is permanently connected to either the deck or the beam.

It is also an object of the invention to provide a new and improved deck and beam connector for a post and beam structure in which the connector is connected to the deck or the beam and is tucked into the deck or beam such that the decks and beams can be easily packaged and handled, stored and shipped.

It is also an object of the invention to provide a new and improved deck and beam connector which is simple in construction and inexpensive to manufacture.

Finally, it is also an object of the invention to provide a new and improved deck and beam connector for a post and beam structure having all of the these features.

In the broader aspects of the invention there is provided a new and improved deck and beam connector for post and beam structures. The deck and beam connector has a deck flange mounted on the deck, the flange has an opening therein. Depending into the deck is a well secured to the flange. The well has a bottom and a bottom opening therein. A threaded bolt having an enlarged head is positioned within the bottom opening with the threaded portion within the well. The head is positioned within a step-diametered counter-sunk bore in the deck with the larger diameter portion thereof adjacent to the surface opposite that to which the deck flange is connected. A threaded member is positioned on the threaded shaft of the bolt within the well with a spring positioned on the bolt between the threaded member and the well bottom. The bolt is moveable between an extended position in which the enlarged head is exterior of the deck and spaced from the opposite deck side to a retracted position in which the bolt head is within the larger diametered portion of the step-diametered bore in the deck. The spring biases the bolt into its retracted position, whereby the bolt may be moved into the extended position to be connected to a beam and tightened to firmly grip the deck and beam between the enlarged head and the deck flange or retracted for storage and shipping.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
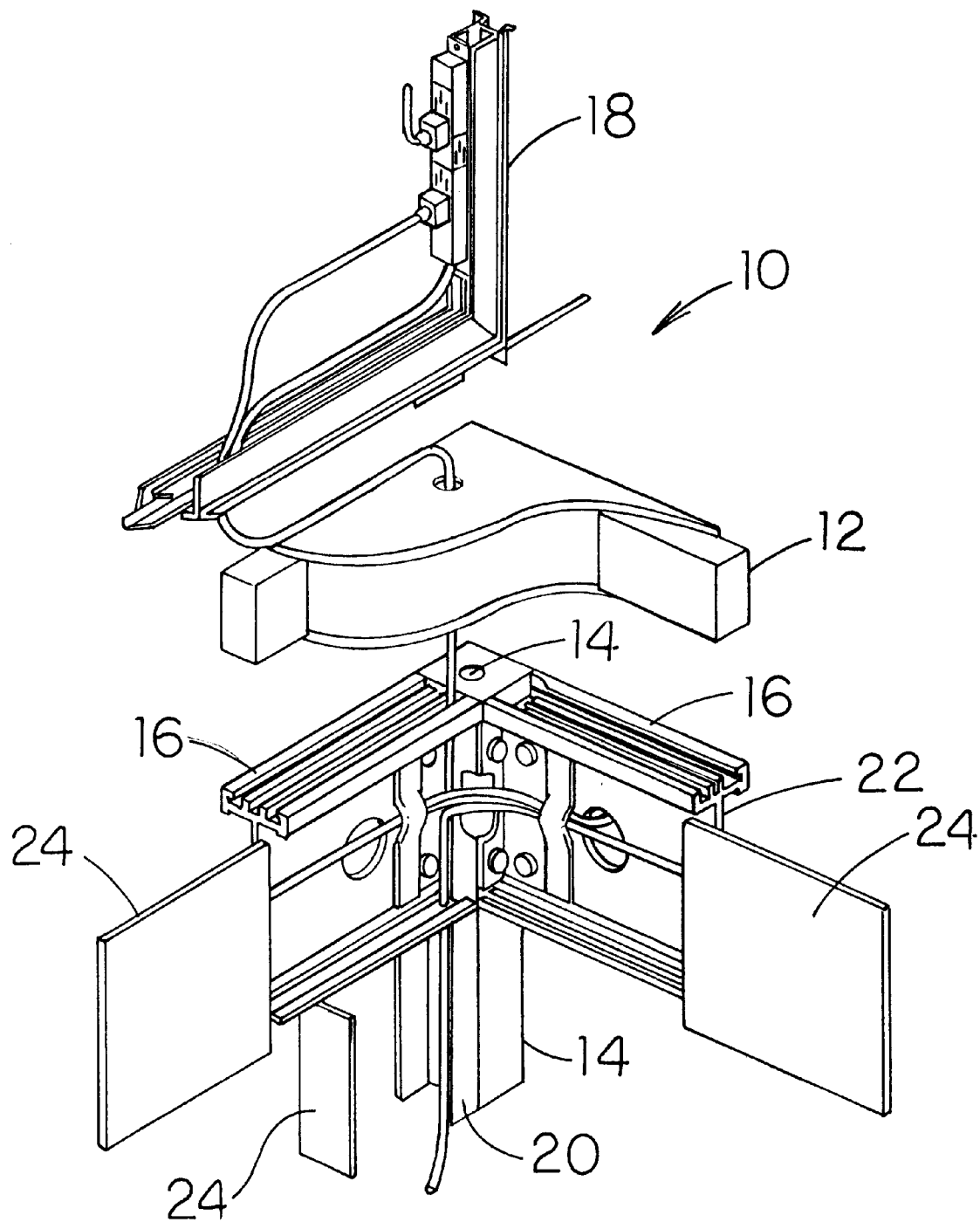
FIG. 1 is an exploded fragmentary view of a post and beam structure having a deck, a beam and a post or column.
Figure 2:
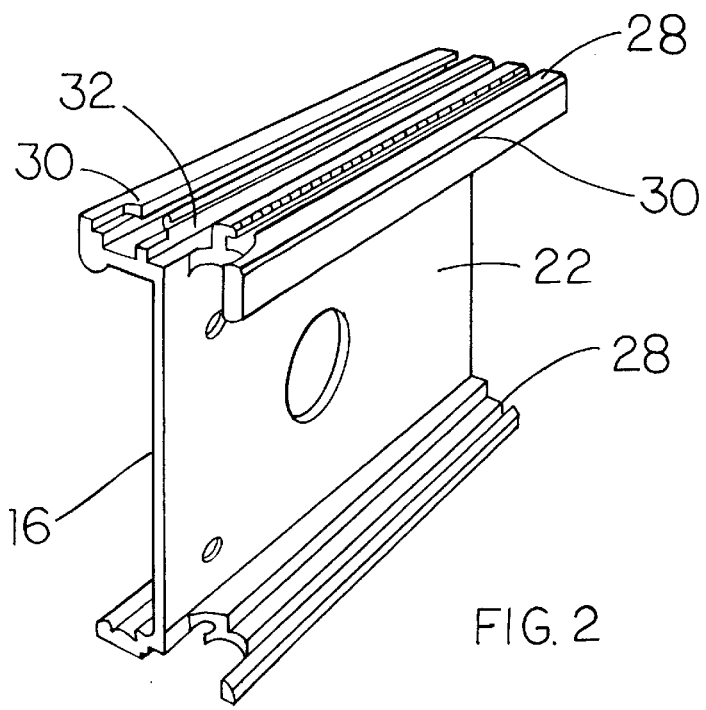
FIG. 2 is a perspective fragmentary view of a beam.

Referring to FIG. 1, there is shown a post and beam structure 10 having a deck 12, a post 14 and two beams 16, coming together at an essentially 90° at a corner. Post 14 may be continued through the deck 12 and upper and lower walls 18 may be connected to the post above and below the beams 16. In the specific embodiment illustrated, it is shown that wiring may be channeled through the beam and through wire channels 20 and through the walls 18 as desired. Panels 24 may be affixed to the beams 16 and to the wire channels 20 to enclose the same, as desired. In other specific embodiments, the post 14 may be omitted, and the deck 12 and beam 16 may be connected remote from any corner and at any position desired.

The beams 16 to which the decks 12 are secured are generally I-beams. In the specific embodiment illustrated, the beams 16 are provided with a web and opposite flanges 28 having a plurality of grooves. In each of the flanges 28 of the beam 16 there are two spaced apart T-shaped grooves 30 extending the entire length of the beam 16 and flange 28. Separating the two T-shaped grooves is a central groove 32.

Figure 7:
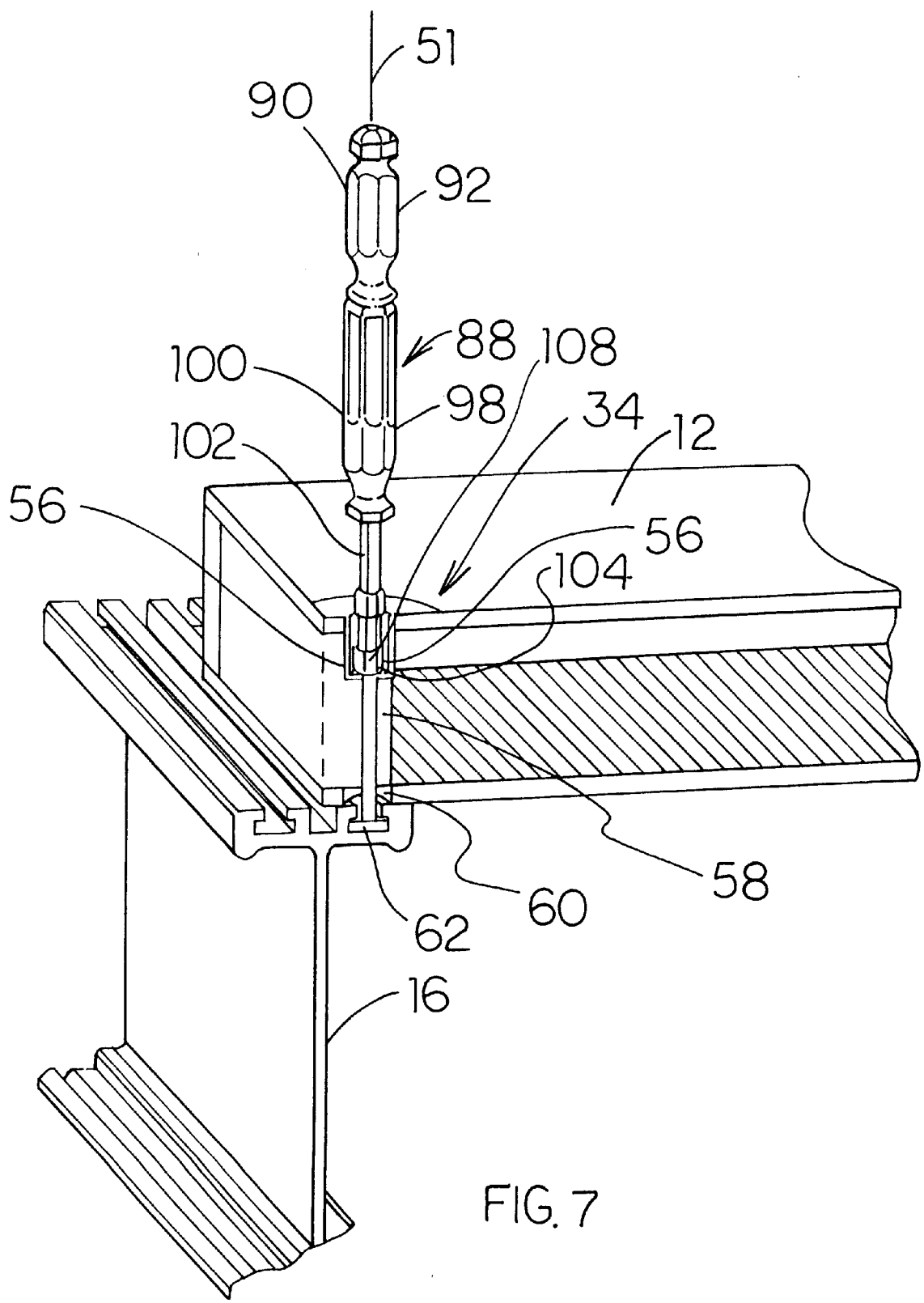
FIG. 7 is a view like FIG. 6 illustrative of the method of the invention.

Referring to FIG. 7, there is shown a deck 12, a beam 16 and a new and improved deck and beam connector 34 of the invention. The connector 34 comprises a deck flange 36 shown in FIG. 3, a threaded bolt 38 shown in FIG. 4, a spring 78 and a nut 80, both shown in FIG. 5.

Figure 3:
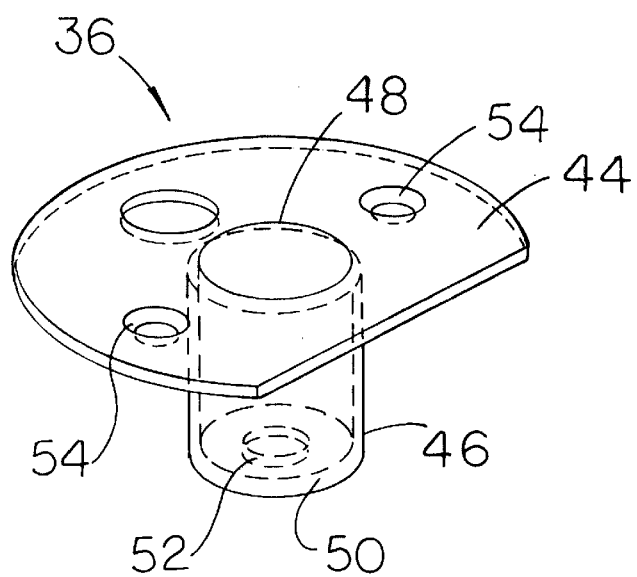
FIG. 3 is a perspective view of a deck flange and well of the new and improved deck and beam connector of the invention.

Referring to FIG. 3, deck flange 36 is shown to include a flange 36 comprising a plate 44 and a well 46. Well 46 is secured to plate 44 and depends therefrom. Plate 44 has a central opening 48 providing access to the well 46. Well 46 has a bottom 50 having a centrally located bottom opening 52 therein. On opposite sides of central opening 48, there are provided a pair of openings 54 for attaching the flange 36 to the deck 12. In the specific embodiment illustrated, plate 44 may be a steel plate of 0.062 thickness. Well 46 may be a cylindrical steel tube having a wall thickness of 0.062 and an inside diameter of 0.75, and bottom 50 may be a steel plate having a thickness of 0.062. Bottom 50, well 46 and plate 44 in the specific embodiment illustrated may be welded together.

Figure 6:
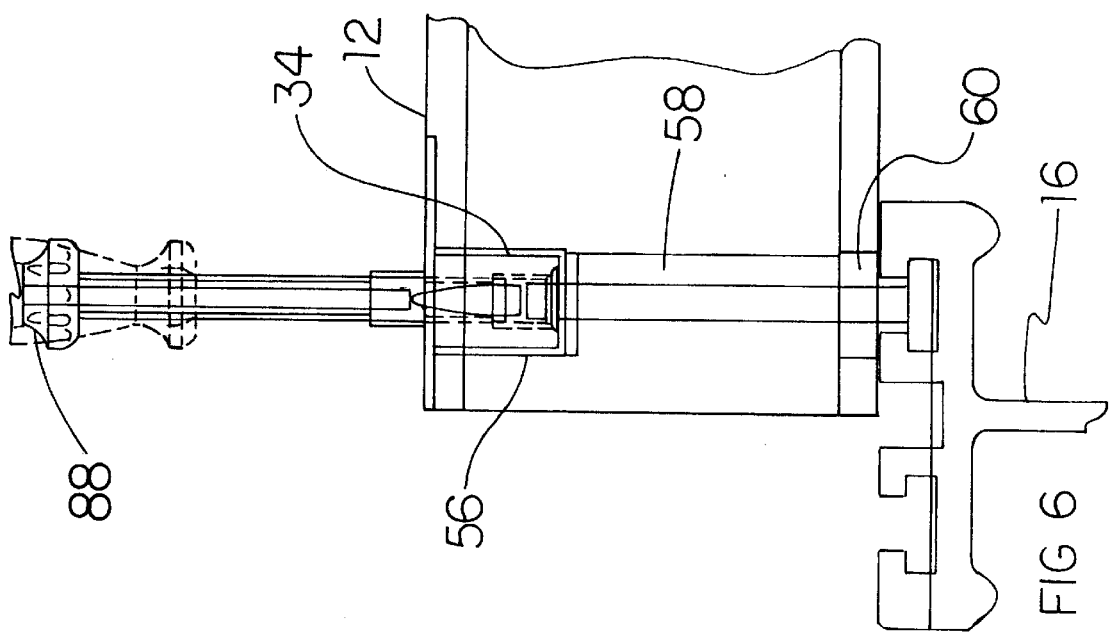
FIG. 6 is a view like FIG. 5 showing the new and improved deck and beam connector of the invention in its extended and secured position.

Flange 36 is secured to the deck 12 by boring a hole 56 in the deck 12 having a diameter slightly larger than well 46 and the deck flange 36 is secured to the deck by two screws positioned in holes 54 and secured to the deck. A bolt hole 58 is bored through the deck along the axis 51 of bottom bore 52 and having a size equal to or larger than bore 52. On the opposite surface of the deck 12 as shown in FIGS. 6 and 7, there is drilled a bore 60. Bore 60, above bore 56 and bolt hole 58 are all on the same axis 51.

Figure 4:
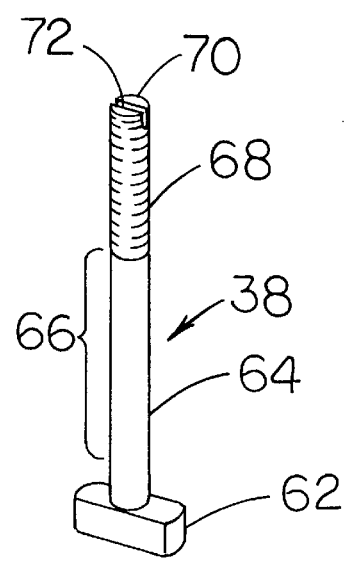
FIG. 4 is a perspective view of the bolt of the new and improved deck and beam connector of the invention.

Referring to FIG. 4, there is shown a bolt 38. Bolt 38 is positioned within bottom hole 52 and bolt hole 58. Bolt 38 has an enlarged head 62 and a shank 64. Shank 64 has an unthreaded portion 66 and a threaded portion 68 and a slot 72 in the shank end 70. In the shank end 70, screwdriver slot 72 extends from side to side across the shank end 70 of threaded portion 68. In the specific embodiment illustrated in FIG. 4, head 62 has the same thickness as the diameter of the shank 70 and is enlarged in only one direction.

Various dimensional relationships exist between the grooves 30, 32 of beam 16, and the bolt 38. T-shaped grooves 30 have a slot opening 74 which is larger than the diameter of shank 64 and the smallest diameter of head 62. Grooves 30 also have head slots 76 which are dimensioned to include head 62 of bolt 38. Thus, both the width and height of head slot 76 are larger than the head 62. In a specific embodiment, head slot 76 may be dimensioned so as to restrict rotation of bolt 38 in head slot 76. Bottom hole 52 and bolt hole 58 both have a diameter larger than shank portion 64 of bolt 38. Deck 12 has a dimension in the direction of the thickness of deck 12 slightly larger than the length of bolt 38 so that bolt 38 may be totally positioned within deck 12 as described hereinafter.

The deck and beam connector 34 of the invention is assembled on the deck 12 by securing the flange 36 to the deck 12 in the manner above described with the well 46 within the bore 56. Bolt 38 is positioned within the bolt holes 58 and 52 with head 62 being positioned within countersink bore 60. Threaded shank 68 of bolt 38 extends through bottom hole 52 of well 46 and is positioned within well 46. A spring 78 is positioned on threaded portion 68 and extends from bottom 50 of well 46 to a position adjacent distal end 70 of shank 64. A threaded nut 80 is positioned on threaded shank portion 68 to hold the spring 78 and bolt 38 in position. Depending upon the spring, a washer 82 may have to be positioned between the spring and the nut so as to apply the compressive force to the spring between the nut and the bottom 50 of the well 46. In a specific embodiment, spring 78 is a coil spring having a tapered coil such that washer 82 can be eliminated and the nut 80 is in contact with the smaller of the spring ends whereas the larger of the spring ends is in contact with well bottom 50. In another embodiment, washer 82 is utilized with a coil spring having a cylindrical shape.

Figure 5:
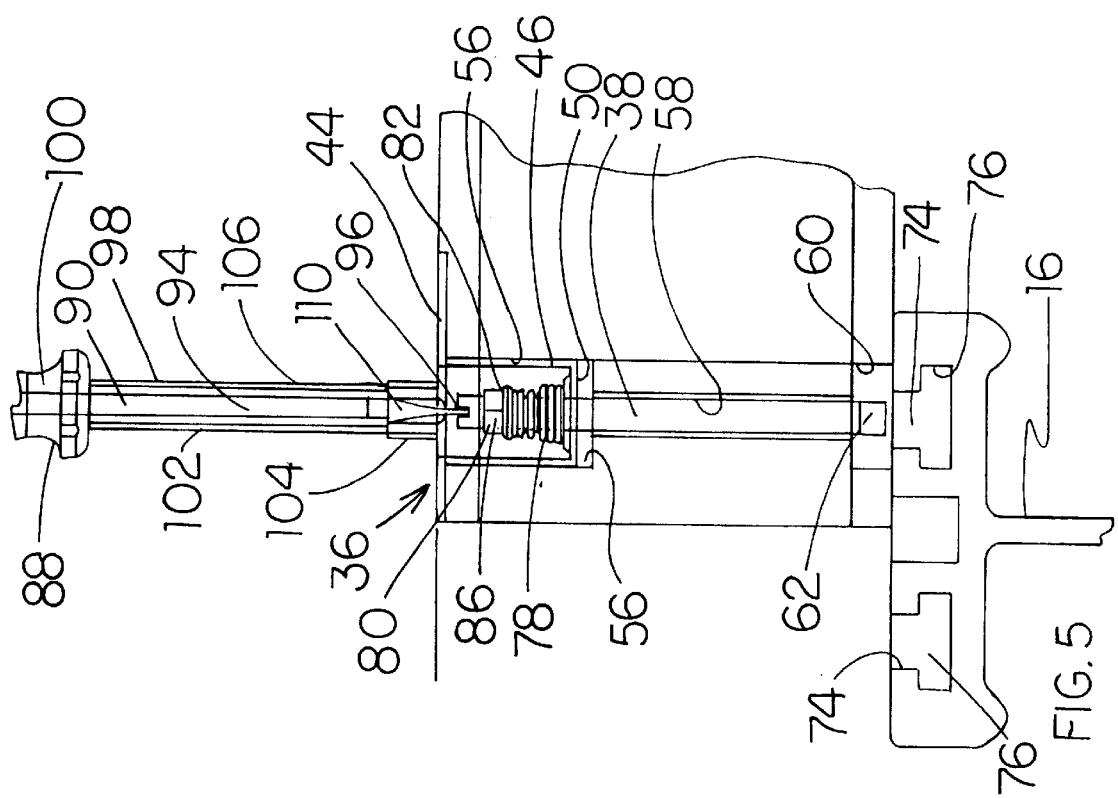
FIG. 5 is a view of the deck and beam together with the new and improved deck and beam connector of the invention in its retracted position and its associated tool showing an end view of the beam and the deck in cross-section.

Spring 78 acts to resiliently urge the bolt 38 toward the plate 44 of flange 36 and to position bolt head 62 within countersunk bore 60. Bolt 38 is moveable from its retracted position 84 as shown in FIG. 5 to its extended position 86 as shown in FIG. 6 by compressing the spring 78 between the nut 80 and the well bottom 50. Similarly, bolt 38 is movable from its extended position 86 to its retracted position 84 by allowing the spring 78 to expand.

Tool 88 is required to operate the new and improved deck and beam connector of the invention. Tool 88 includes a screwdriver 90 having a handle 92 with a shank 94 and a shaped head 96 to be complementary to the screwdriver slot 72 in end 70 of shank 64 of bolt 38. Nut driver 98 is provided with a handle 100, a shank 102, and a distal end 104 shaped to be complementary to nut 80. Handle 100, shank 102 and distal end 104 each have a central bore 106 extending therethrough. As shown in FIGS. 5, 6 and 7, screwdriver 90 is positioned co-axially of nut driver 98 with the screwdriver shank 94 positioned within bore 106 with the handles 92, 100 aligned end to end. Shank 94 of screwdriver 90 has a length slightly longer than the total length of handle 100 and shank 102 of nut driver 98 such that when the handles 92, 100 are end to end, the distal end 96 of the screwdriver 90 extends from the distal end 104 of the nut driver as shown in FIG. 5. Also, as shown in FIG. 6, screwdriver 90 in relation to nut driver 98 has a retracted position 108 as shown in FIG. 7 and an extended position 110 in FIG. 6.

In a specific embodiment, screwdriver 90 and nut driver 98 can be conventional in all respects except that conventional nut drivers usually do not have bore 106 extending therethrough the handle and the shank.

In operation, the new and improved deck and beam connector of the invention, is assembled on the deck having a bore 56 operating at the top or upwardly facing surface of the deck, 12 and a counter bore 60 opening at the bottom surface of the deck 12, and a bolt hole 58 extending therebetween. Bore 56, counterbore 60 and bolt hole 58 are each on the same axis and are co-axial.

The flange 36 is positioned on the upwardly facing surface of deck 12 with the well 46 within the bore 56. Two screws or other fasteners are positioned within attachment holes 54 to secure the plate 44 to the deck 12.

Bolt 38 is then positioned within bolt hole 58 with its head 62 within the countersunk bore 60 and its threaded portion within well 46 extending through bottom hole 52 and being positioned within the well 46. The spring 78 is positioned on the threaded portion 68 of the bolt 38 so as to rest on the well bottom 50 and the nut 80 is threadably positioned on the threaded portion 68 of the bolt 38 so as to position the spring between the nut 80 and the well bottom 50. With the nut so attached, the new and improved deck and beam connector of the invention is attached to the deck 12. Against the resiliency of the spring 78, the bolt 38 and its head 62 can be moved within the bolt hole 58 so as to extend the head 62 from the countersunk bore 60 as shown in FIG. 6 or to allow the head 62 to be positioned within the countersunk bore 60 as shown in FIG. 5.

By use of the tool 88, the deck 12 can now be firmly attached to the beam 16 by positioning the deck 12 on the beam 16 with the countersunk bore 60 of the deck 12 over one of the T-shaped grooves 30. Placing the tool in alignment with the bolt 38 with the distal end of the screwdriver within the slot 72. In this position, the screwdriver 90 may be moved into its extended position so as to extend bolt 38 and head 62 from the countersunk bore 60 into the T-shaped grooves 30 through the slot opening 74 into the slot head space 76. By rotating the screwdriver 90°, the head can then be rotated 90° in the head slot opening 76 to position the bolt 38 in the position shown in FIG. 6.

In this position, the deck and beam structure can be fully secured together by rotating the nut driver 98 to firmly hold the deck and beam between the head 62 and the well bottom 50. The nut 80 may be tightened as tight as desired to give the construction all of the strength of a conventional bolt assembled structure.

The new and improved deck and beam connector for post and beam structures provides means by which decks and beams may be connected which is both strong and secure, and yet may be quickly disconnected and re-connected as desired. The new and improved deck and beam connector of the invention is permanently connected to the deck such that there are no loose parts which need to accounted for when the deck and beam structure is constructed or disconnected, and thus, both the deck and the beams can be easily packaged, handled, stored and shipped without accounting for loose parts. The new and improved deck and beam connector of the invention is simple in construction and inexpensive to manufacture.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A deck and beam connector for a post and beam structure comprising a deck flange, said flange having a plate within an opening therein, a well secured to said plate, said well depending from said plate beneath said opening, said well having a bottom, said bottom having a bottom hole therein, a threaded bolt having an enlarged head and a threaded shaft, said bolt being positioned in said bottom hole with said threaded shaft being positioned in said well, a threaded member on said shaft and within said well, and a spring between said threaded member and said well bottom, said bolt being moveable between an extended position and a retracted position, said spring biasing said bolt into said retracted position, whereby said bolt may be moved between said retracted and extended positions and tightened to firmly grip a deck and beam between said enlarged head and said flange.

2. The connector of claim 1 wherein said plate is disc shaped.

3. The connector of claim 1 wherein said well is cylindrical.

4. The connector of claim 1 wherein the depth of said well exceeds the distance between said extended and retracted positions of said bolt.

5. The connector of claim 1 wherein said threaded portion of said bolt is larger than the distance between said extended and retracted positions of said bolt.

6. The connector of claim 1 wherein said head is enlarged in one direction greater than the other directions.

7. The connector of claim 1 wherein said head is a "T" shaped head.

8. The connector of claim 1 wherein said head is a rectangular shaped head.

9. The connector of claim 1 wherein said head is a hex shaped head.

10. The connector of claim 1 wherein said threads on said shaft extend from the shaft end opposite said head to a position spaced apart from said head.

11. The connector of claim 1 wherein said threaded member is a conventional nut.

12. The connector of claim 1 wherein said threaded member includes a washer and a conventional nut.

13. The connector of claim 1 wherein said threaded member includes a nut at one end thereof and an enlarged head at the other end thereof, said spring extending between said well bottom and said nut.

14. The connector of claim 1 wherein said threaded member includes a nut and a spring retainer, said spring extending between said spring retainer and said bottom.

15. The connector of claim 1 wherein said threaded member has a dimension larger than said bottom hole.

16. A deck and beam connector for a post and beam structure comprising a deck, a deck flange, a bore in said deck, said bore extending a partial way through the thickness of said deck, said bore having a bore bottom, a bolt hole extending through said deck, a second bore extending part way through said deck, said first and second bores extending into said deck in opposite directions, said bolt hole extending between said first and second bores, said first and second bores and bolt hole being on the same axis, a deck flange, said flange having a plate with an opening therein, a well secured to said plate, said well depending from said plate beneath said opening, said well having a bottom, said bottom having a bottom hole therein, a threaded bolt having an enlarged head and a threaded shaft, said deck flange being secured to said deck with said well in said bore, said well bottom being adjacent to said bore bottom, said well bottom hole being on the same axis as said first and second bores and bolt hole, said bolt being positioned in said bottom hole and said bolt hole with said threaded shaft in said well and said head in said second bore, a threaded member on said shaft and within said well, and a spring between said threaded member and well bottom, said bolt being moveable between an extended position in which said head is exterior of said deck and a retracted position in which said head is in said second bore, said spring biasing said bolt in said retracted position, whereby said bolt may be moved between said retracted and extended positions and tightened to firmly grip a deck and beam between said enlarged head and said flange.

17. Deck and beam construction for a post and beam structure comprising a beam, said beam having opposite flanges interconnected by a web, at least one of said flanges having a passage therein extending between the opposite ends of said beam, said passage having an opening in said one flange, thereby forming a "T" shaped groove in said one flange with an opening in said flange, a deck, a deck flange, a bore in said deck, said bore extending a partial way through the thickness of said deck, said bore having a bore bottom, a bolt hole extending through said deck, a second bore extending part way through said deck, said first and second bores extending into said deck in opposite directions, said bolt hole extending between said first and second bores, said first and second bores and bolt hole being on the same axis, a deck flange, said flange having a plate with an opening therein, a well secured to said plate, said well depending from said plate beneath said opening, said well having a bottom, said bottom having a bottom hole therein, a threaded bolt having an enlarged head and a threaded shaft, said deck flange being secured to said deck with said well in said bore, said well bottom being adjacent to said bore bottom, said well bottom hole being on the same axis as said first and second bores and bolt hole, said bolt being positioned in said bottom hole and said bolt hole with said threaded shaft in said well and said head in said second bore, a threaded member on said shaft and within said well, and a spring between said threaded member and well bottom, said bolt being moveable between an extended position in which said head is exterior of said deck and a retracted position in which said head is in said second bore, said spring biasing said bolt in said retracted position, whereby said bolt may be moved between said retracted and extended positions and tightened to firmly grip a deck and beam between said enlarged head and said flange, said head being positioned in said passage of said beam when said bolts in said extended position, said threaded member being rotatable about said threaded portion of said bolt to compress said spring and to firmly hold said deck and beam flange between said threaded member and said enlarged head of said bolt connecting deck and beam together, whereby said deck and beam can be connected and disconnected as desired.

18. The deck and beam construction of claim 17, wherein said flange is disc shaped, said well is cylindrical, the depth of said well exceeds the distance between said extended and retracted positions of said bolt, said threaded shaft of said bolt is longer than the distance between said extended and retracted positions of said bolt, said head is enlarged in one direction greater than the other direction, said threaded shaft extends from the shaft end opposite said head to a position spaced apart from said head, said threaded member is conventional nut, said spring extending between said well bottom and said head.

* * * * *